United States Patent
Salter et al.

(10) Patent No.: US 9,464,803 B2
(45) Date of Patent: Oct. 11, 2016

(54) ILLUMINATED SPEAKER

(71) Applicant: Ford Global Technologies, LLC, Dearborn, MI (US)

(72) Inventors: Stuart C. Salter, White Lake, MI (US); James J. Surman, Clinton Township, MI (US); Bhavani Thota, Novi, MI (US); Linh Doan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/961,177

(22) Filed: Dec. 7, 2015

(65) Prior Publication Data

US 2016/0084493 A1   Mar. 24, 2016

Related U.S. Application Data

(63) Continuation-in-part of application No. 14/086,442, filed on Nov. 21, 2013.

(51) Int. Cl.

| | |
|---|---|
| *B60Q 1/00* | (2006.01) |
| *B60Q 1/26* | (2006.01) |
| *F21V 33/00* | (2006.01) |
| *H04R 1/02* | (2006.01) |
| *F21V 9/16* | (2006.01) |
| *B60Q 3/02* | (2006.01) |
| *B60R 11/02* | (2006.01) |
| *F21V 14/08* | (2006.01) |
| *F21V 13/08* | (2006.01) |
| *F21Y 101/00* | (2016.01) |

(52) U.S. Cl.
CPC ......... *F21V 33/0056* (2013.01); *B60Q 3/0209* (2013.01); *B60Q 3/0243* (2013.01); *B60Q 3/0279* (2013.01); *B60Q 3/0283* (2013.01); *B60R 11/0217* (2013.01); *F21V 9/16* (2013.01); *F21V 13/08* (2013.01); *F21V 14/08* (2013.01); *H04R 1/028* (2013.01); *B60Q 2500/10* (2013.01); *F21Y 2101/00* (2013.01)

(58) Field of Classification Search
CPC   B60Q 3/0209; B60Q 3/0243; B60Q 3/0279; B60Q 3/0283; B60R 11/0217; F21V 9/16; F21V 13/08; F21V 14/08; F21V 33/0056; H04R 1/028
USPC .......................... 362/86, 487–488, 509–510
See application file for complete search history.

(56) References Cited

U.S. PATENT DOCUMENTS

| | | |
|---|---|---|
| 5,709,453 A | 1/1998 | Krent et al. |
| 6,117,362 A | 9/2000 | Yen et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

A speaker is provided herein. The speaker includes a light source configured to emit inputted light. A diaphragm is configured to move as a magnet receives electrical signals. A first photoluminescent structure is disposed on the diaphragm. A second photoluminescent structure is also disposed on the diaphragm. The inputted light emitted from the light source is converted to outputted light by the first and second photoluminescent structures.

19 Claims, 9 Drawing Sheets

(56) References Cited

U.S. PATENT DOCUMENTS

| | | |
|---|---|---|
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,773,012 B2 | 7/2014 | Ryu et al. |
| 8,846,184 B2 | 9/2014 | Agrawal et al. |
| 8,952,341 B2 | 2/2015 | Kingsley et al. |
| 9,057,021 B2 | 6/2015 | Kingsley et al. |
| 9,065,447 B2 | 6/2015 | Buttolo et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 | though
ILLUMINATED SPEAKER

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE," the entire disclosure of which is hereby incorporated herein by reference.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present disclosure, a speaker is disclosed. The speaker includes a light source configured to emit input light. A diaphragm is configured to move as a magnet receives electrical signals to produce sound. A first photoluminescent structure is disposed on the diaphragm. A second photoluminescent structure is disposed on the diaphragm. The input light emitted from the light source is converted to output light of a different wavelength by the first and second photoluminescent structures.

According to another aspect of the present disclosure, a vehicle is disclosed. The vehicle includes a speaker including a diaphragm. A light source is configured to emit inputted light at a first wavelength towards the diaphragm. A first photoluminescent structure is disposed on the diaphragm. The first photoluminescent structure is configured to luminesce in response to excitation by the light source.

According to yet another aspect of the present disclosure, an illuminated speaker for a vehicle is disclosed. The illuminated speaker includes a light source configured to emit inputted light optically coupled with a component of the speaker. A first photoluminescent structure is disposed on the component and configured to emit outputted light in response to light emitted from the light source. The inputted light and outputted light are of varying wavelengths.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
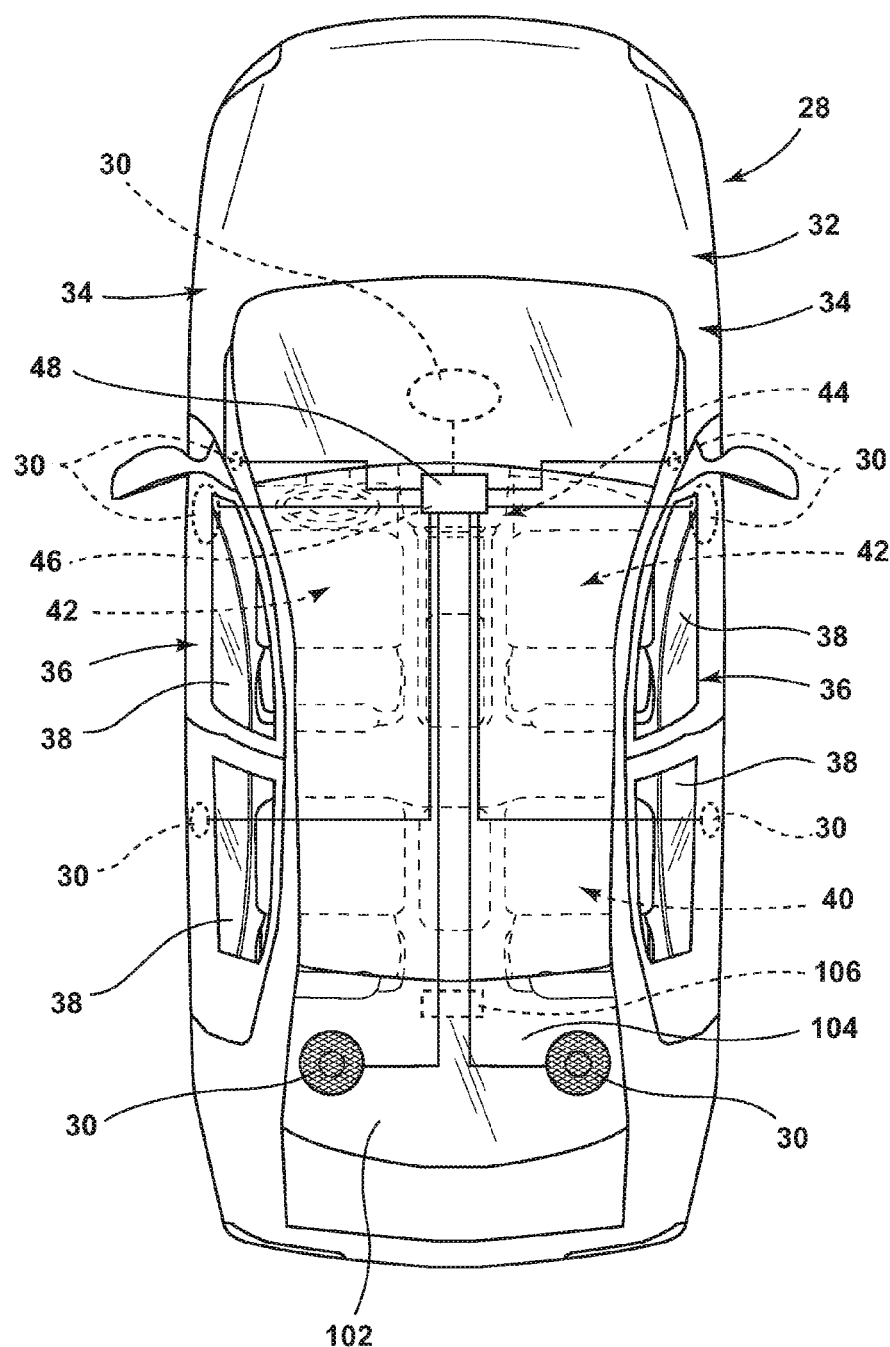
FIG. 2 is a top perspective view of a motor vehicle incorporating an illuminated speaker, according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated speaker for a vehicle that is configured to passively illuminate a portion thereof. The illuminated speaker may advantageously employ one or more photoluminescent structures that are configured to illuminate in response to pre-defined events. The one or more photoluminescent structures may be configured to convert light received from an associated light source and re-emit the light at a different wavelength typically found in the visible spectrum.

Figure 1A:
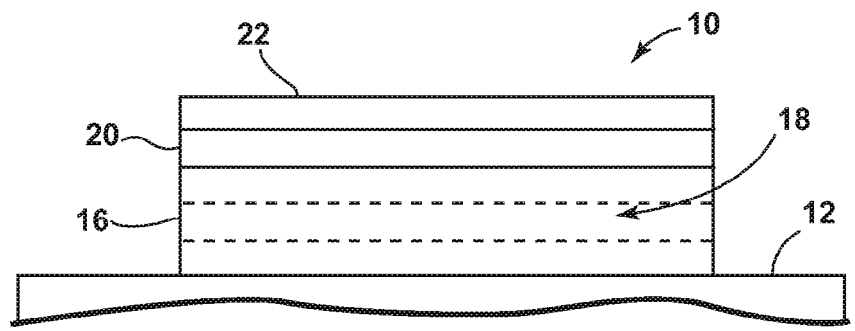
FIG. 1A is a side view of a photoluminescent structure rendered as a coating for use in a photoluminescent latch assembly according to one embodiment.
Figure 1B:
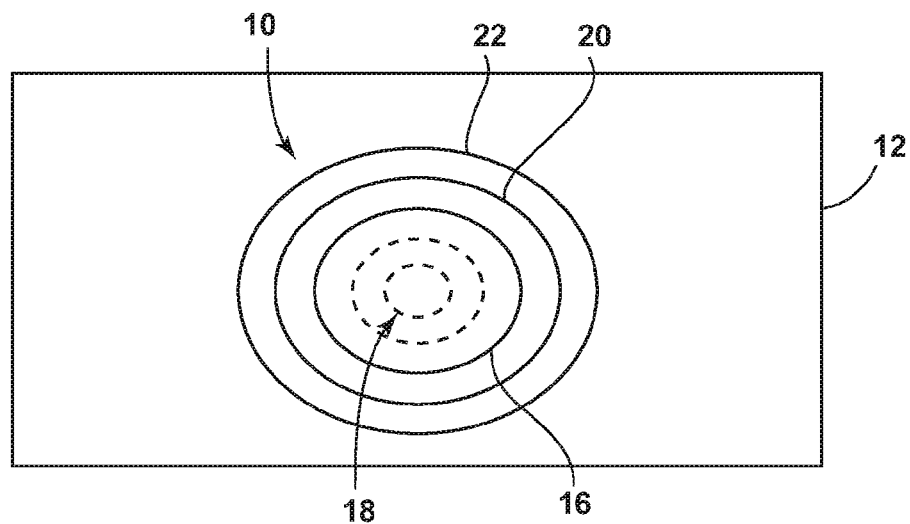
FIG. 1B is a top view of a photoluminescent structure rendered as a discrete particle according to one embodiment.
Figure 1C:
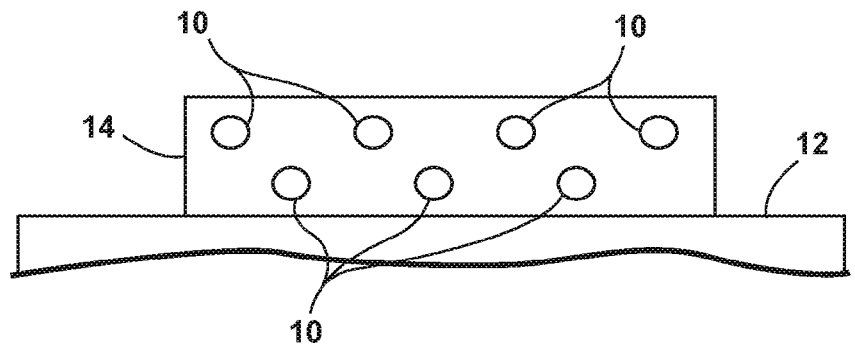
FIG. 1C is a side view of a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials 18 having energy converting elements with phosphorescent or fluorescent properties. Each photoluminescent material 18 may become excited upon receiving light of a specific wavelength, thereby causing the light to undergo a conversion process. Under the principle of down conversion, an inputted light 24 (FIG. 5) is converted into a longer wavelength or outputted light 26 (FIG. 5) that is emitted from the photoluminescent structure 10. Conversely, under the principle of up conversion, the inputted light 24 is converted into a shorter outputted wavelength light that is emitted from the photoluminescent structure 10. When multiple distinct wavelengths of light are outputted from the photoluminescent structure 10 at the same time, the wavelengths of light may mix together and be expressed as a multicolor light.

In some embodiments, outputted light 26 that has been down converted or up converted may be used to excite other photoluminescent material(s) 18 found in the energy conversion layer 16. The process of using converted outputted light 26 from one photoluminescent material 18 to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various embodiments discussed herein, each of the photoluminescent structures 10 may operate under either conversion principle.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier medium and coating the energy conversion layer 16 to a desired substrate. The energy conversion layer 16 may be applied to a substrate 12 by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material 18 into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protection layer 20 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference. For additional information regarding fabrication and utilization of photoluminescent materials to achieve various light wavelengths, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

Referring to FIG. 2, a top view of a vehicle 28 is shown having a plurality of illuminated speakers 30 disposed within the vehicle 28. The vehicle 28 generally includes a body 32, a chassis, and a power train driving the road wheels to move the vehicle 28. The body 32 generally includes side panels 34, doors 36, windows 38, and a roof that generally define an enclosed cabin referred to as the passenger compartment 40 of the vehicle 28. The passenger compartment 40 generally contains a plurality of seating assemblies 42 for the driver and other passengers, in addition to various vehicle controls.

Located within the passenger compartment 40 are various electronics systems and devices, such as an entertainment, infotainment, and telematics systems. The entertainment, infotainment and telematics systems may include, but are not limited to, a radio 44, a human machine interface (HMI) 46 capable of controlling any electronic systems within the vehicle 28, an automotive personal computing device, a web browser, an Internet access device, a satellite communication system, a mobile multimedia system, a television, a DVD player, a video game player, a navigation system, a phone/address book lookup system, a rear or side obstruction system, a vehicle information and control system, and other types of electronic devices and systems.

Any of the electronic systems may cooperate with the vehicle audio system 48, which may include any type of audio speaker 30 compatible with the vehicle 28 that is coupled to the audio system 48 for producing sounds therefrom. For example, the speaker 30 may be a subwoofer. Other types of speakers may also be utilized including, without limitation, woofers, midranges, tweeters and combination or "multi-way" speakers having a plurality of speakers assembled into a unitary body. The speaker 30 may be of any physical size, diameter, depth, or shape that is compatible with the location in which the speaker 30 is to be mounted and may further have any desired electrical and/or acoustic characteristics such as power rating, impedance and response frequencies, among others, that are compatible with the vehicle's audio system 48.

A single speaker 30 or a plurality of speakers 30 may be mounted in the vehicle 28 and may include a light source 80 (FIG. 4) and a photoluminescent structure 10 (FIG. 4) disposed on a portion of the speaker 30. Thus, each speaker 30 may be independently illuminated, or alternatively, a plurality of speakers 30 may each illuminate in concert with any other speaker 30 and/or component within the vehicle 28 in any desired pattern. It will be appreciated that the illuminated speaker 30 may be utilized in stereo systems that are unrelated to a vehicle 28; thus, the teachings provided herein should not be seen as limiting the illuminated speaker 30 to only vehicular usage.

Figure 3:
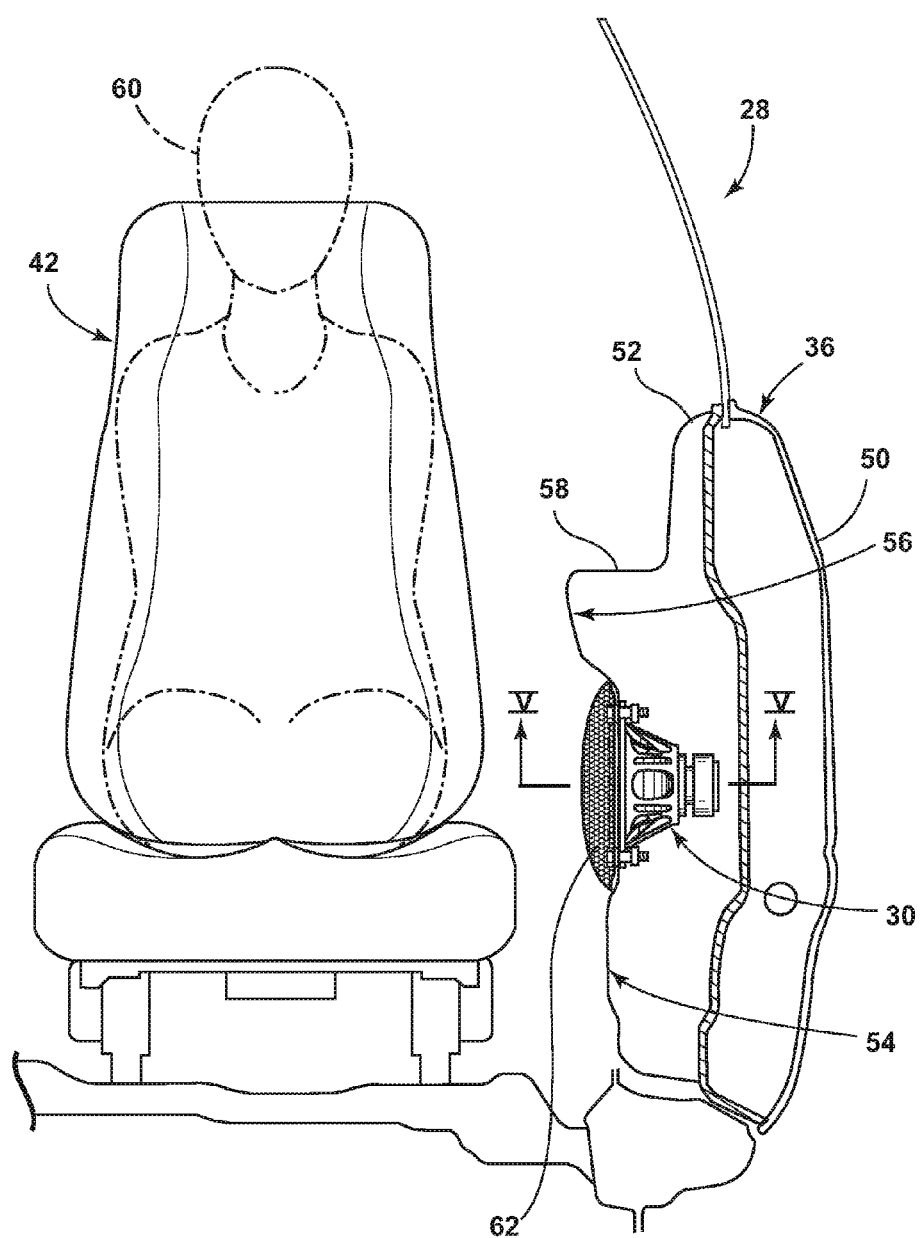
FIG. 3 illustrates a vehicle door having an illuminated speaker system, according to one embodiment.

Referring to FIG. 3, an exemplary door 36 is illustrated having a door-mounted illuminated speaker 30 mounted therein. The door 36 includes an outer door panel or exterior side 50. On the interior side of the door 36, a door trim 52 may provide a decorative or an aesthetically pleasing appearance to the interior of the vehicle 28. The interior door trim 52 includes a lower portion 54 and an upper portion 56 having an arm rest 58 positioned at a conventional and convenient location for use thereof by an occupant 60. Adjacent to the door 36, an occupant 60 sits in the seating assembly 42.

The speaker 30 is mounted to the interior door panel through any means known in the art. A speaker grill 62 may be disposed over the speaker 30. The grill 62 may be attached to the speaker 30, to the interior door panel, or integrally formed with a portion of the interior door panel. The speaker 30 may be disposed at a position forwardly of the occupant 60 of the proximately disposed seating assembly 42, or in any other desired positon. It will be appreciated that the illuminated speaker 30 may be disposed within any position within the vehicle 28, and is not limited to mounting within door(s) 36.

Figure 4:
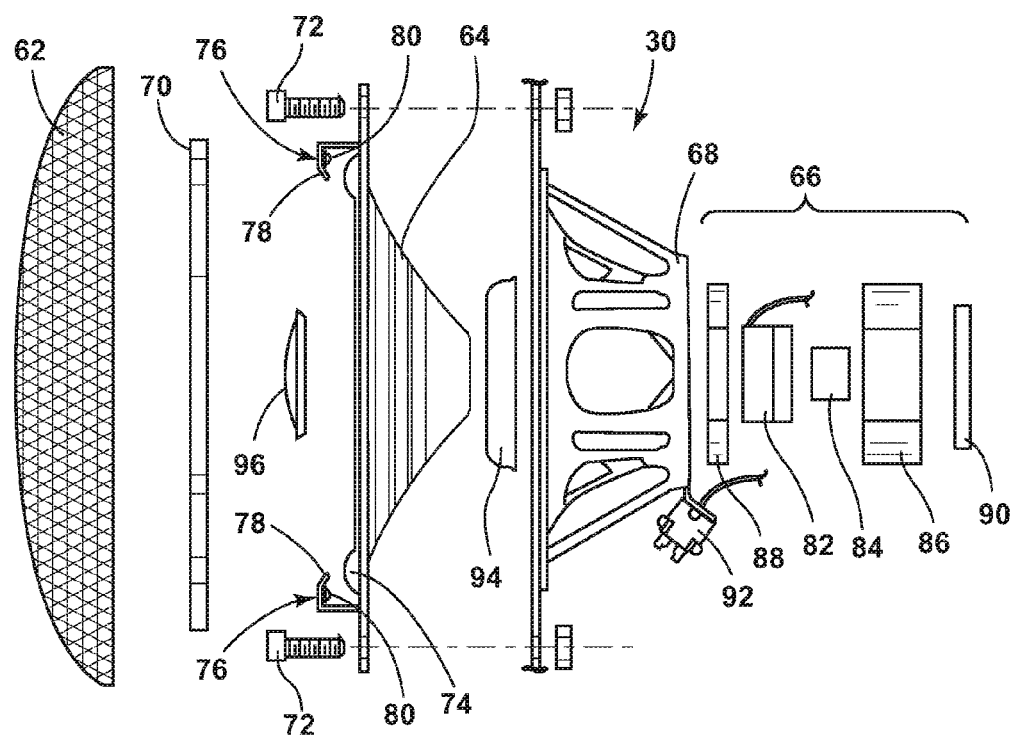
FIG. 4 is an exploded view of an exemplary illuminated speaker, according to one embodiment.

Referring to FIG. 4, the speaker 30 includes a diaphragm 64, a grill 62, a magnetic assembly 66, a frame 68, and a damping ring or absorption device 70. The speaker 30 may be attached to the door 36 through the use of a fastener 72. As recognized by one of ordinary skill in the art, during normal operation, the magnetic assembly 66 is configured to receive electrical signals that cause movement of the diaphragm 64 so as to produce sound.

The diaphragm 64 may be attached to the frame 68 through the use of a suspension surround 74. As recognized by one of ordinary skill in the art, the suspension surround 74 enables movement of the diaphragm 64 in reference to the frame 68 as sound is produced by speaker 30. The movement may be in a substantially forwardly and rearwardly direction along an axis extending from the center point of the diaphragm 64, the magnetic assembly 66. Alternately, the diaphragm 64 may move along any other axis without departing from the teachings provided herein. The suspension surround 74 may further include an attachment structure 76 thereon that includes a reflective member 78 extending therefrom, as will be described in greater detail below. The attachment structure 76 may also include the light source 80 thereon that is orientated towards the diaphragm 64.

The absorption device 70 is positionable about the frame 68 and is configured to dampen the effects of resonance created by the speaker 30 during operation. Additionally, the absorption device 70 may be configured to absorb energy transferred from the door 36 during impact events. The frame 68 may be formed of a polymer composite or metallic alloy material. It is recognized, however, that the frame 68 may be configured of other materials without departing from the teachings provided herein.

The grill 62 may be attached to the frame 68, door panel, and/or any other structure. The grill 62 may be part of the door trim 52 that is formed as a single trim panel. The grill 62 may be formed of a light-weight plastic, steel, composite material, and the like.

The magnetic assembly 66 includes a voice coil 82, a magnetic core 84, and a magnet 86. In some embodiments, a fixed coil may replace the magnet 86. The voice coil 82, the core 84, and the magnet 86 are held together as a unit by a front or top plate 88 and a back plate 90.

The speaker 30 may further include a terminal 92, the diaphragm 64, a spider 94, which suspends the diaphragm 64, a dust cover 96, and the absorption device 70. The dust cover 96 may be disposed at a center of the diaphragm 64 and prohibit the entrance of contaminants into the speaker 30. The absorption device 70 may dampen the resonance created by sound frequencies. The absorption device 70 may be formed of a foam material. It will be understood that the speaker 30 described herein is just an exemplary embodiment, and that any speaker 30 known in the art may be utilized without departing from the teachings provided herein.

Figure 5:
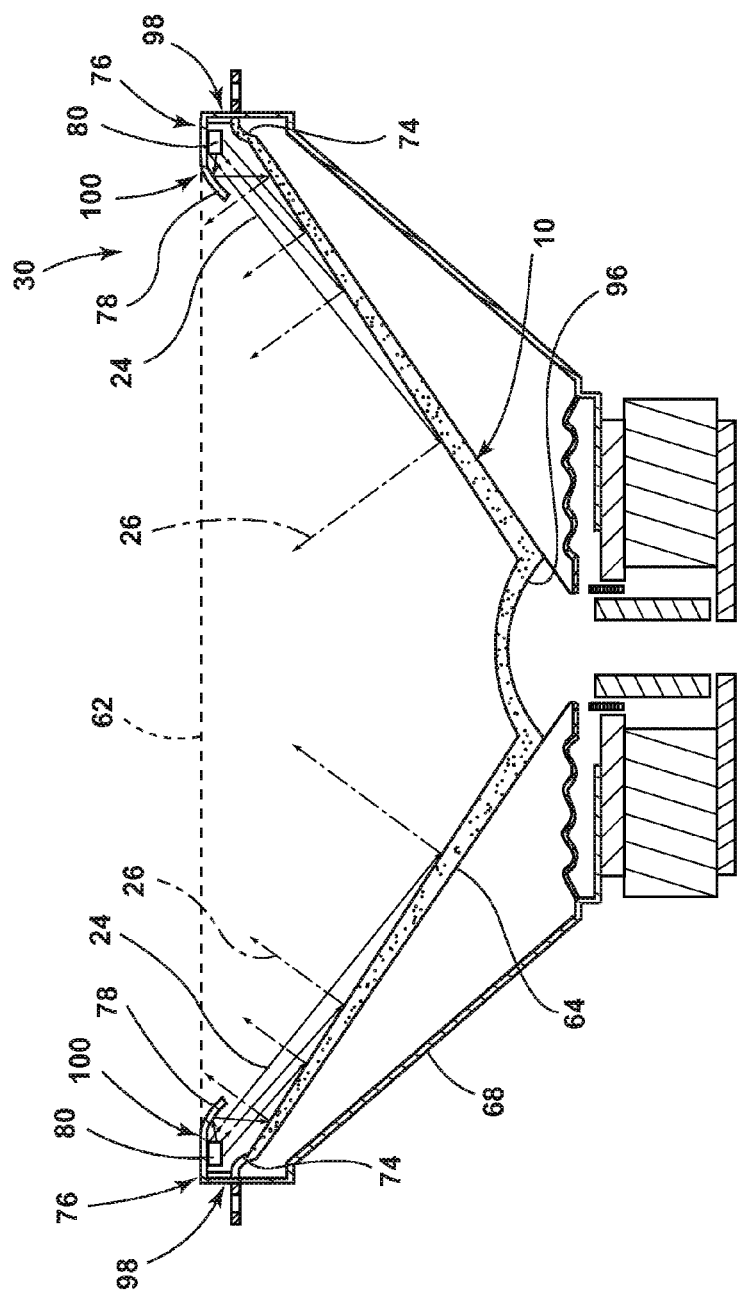
FIG. 5 is a cross-sectional view of the illuminated speaker taken along the live V-V of FIG. 3, according to one embodiment, having a photoluminescent structure disposed over a diaphragm and dust cap of a speaker.

Referring to FIG. 5, a cross-sectional view of the speaker 30 taken along the line V-V of FIG. 3, according to one embodiment, is illustrated. The speaker 30 may include the attachment structure 76. The attachment structure 76 may include an upwardly extending portion 98 and an inwardly extending portion 100 that has the light source 80 disposed on a bottom surface thereof. The reflective member 78 may be disposed inwardly of each light source 80. The grill 62 may be formed integrally with the attachment structure 76 or attached thereto. Alternatively, the attachment structure 76 may be formed as part of the grill 62 that attaches to the speaker 30. In any manner, the light source 80 is disposed upwardly of the diaphragm 64 and below the grill 62, if a grill 62 is present in the speaker 30 assembly. Moreover, it is contemplated that the light source 80 may be disposed on the grill 62 in alternate embodiments.

Figure 6:
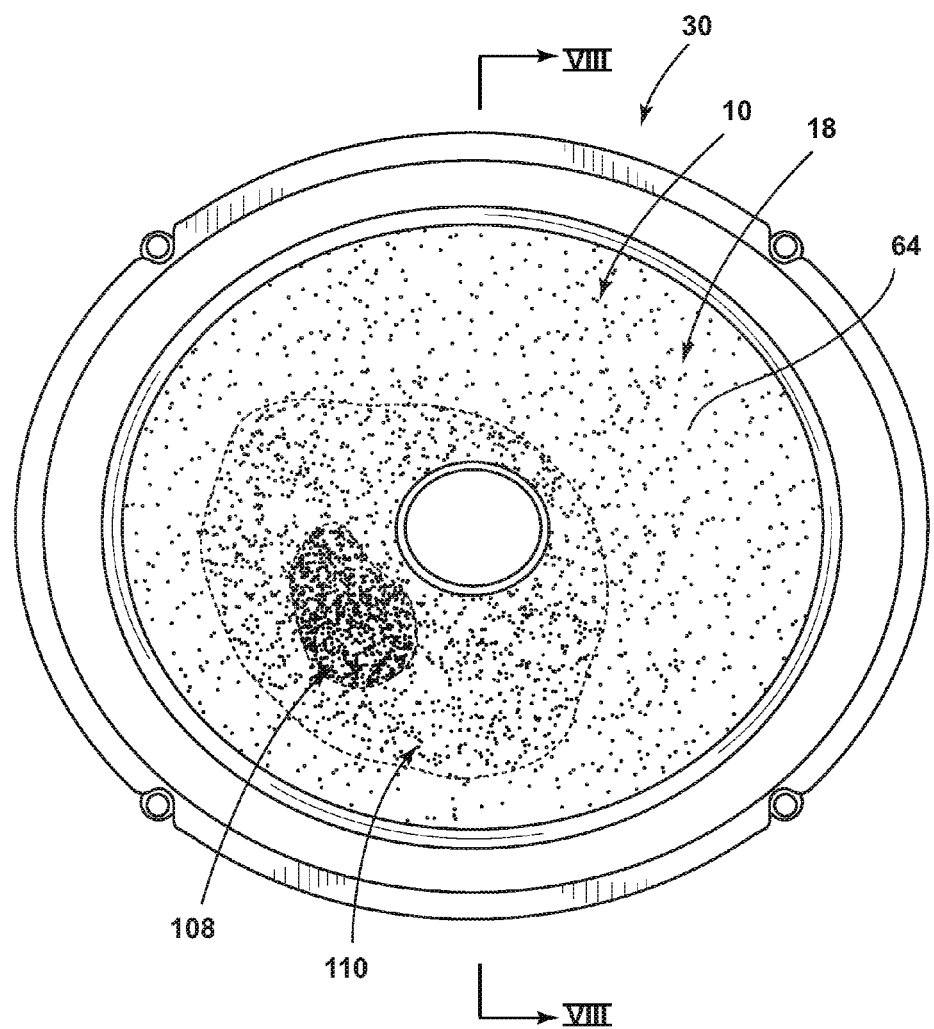
FIG. 6 is a front view of the speaker, according to one embodiment, having a variable concentration of photoluminescent material disposed on the diaphragm of the speaker.

The light source 80 is configured to emit inputted light 24 downwardly, towards the diaphragm 64, at a first wavelength. The photoluminescent structure disposed on a portion of the diaphragm 64 is excited by the inputted light 24 and, in response, emits outputted light 26 at a second wavelength. The light source 80 may comprise any form of light source. For example fluorescent lighting, light emitting diodes (LEDs), organic LEDs (OLEDs), polymer LEDs (PLEDs), solid state lighting, or any other form of lighting configured to emit light may be utilized. As illustrated in FIG. 6, the light source 80 is disposed on the attachment structure 76 and is oriented to emit inputted light 24 towards the diaphragm 64 and/or reflective member 78 such that inputted light 24 may be redirected towards the diaphragm 64. According to one embodiment, LEDs may be printed onto an inner surface of the speaker grill 62 to direct light towards the diaphragm 64. Additional information regarding the construction of vehicle components incorporating printed LEDs therein is disclosed in U.S. patent application Ser. No. 14/851,726 to Salter et al., entitled "ILLUMINATED STEERING ASSEMBLY," filed Sep. 11, 2015, the entire disclosure of which is hereby incorporated herein by reference.

Additionally, or alternatively, the light source 80 may include a light guide 112 (FIG. 7) and/or optics disposed around the top circumference of the diaphragm 64 and/or attached to the attachment structure 76. It should be appreciated that the light source 80 may be located on any surface of the vehicle 28 and inputted light 24 emitted therefrom may be directed towards the diaphragm 64 and/or any structure disposed proximately to the speaker 30. It is also contemplated that outputted light 26 emitted from the diaphragm 64 may be utilized for any desired use such as to provide an aesthetic appearance, or may provide vehicle information to an intended observer. For example, a rear parcel shelf 102 (FIG. 2) may include an illuminated speaker 30 therein that is configured to direct red outputted light 26 upwardly towards a rear window 104 (FIG. 2) of the vehicle 28 when a braking system 152 within the vehicle 28 is activated by the occupant 60 of the vehicle 28. Thus, the speaker 30 may be used as a center high-mount stop light (CHMSL), according to one embodiment. Moreover, a translucent material 106 (FIG. 2) may be disposed on a top portion of the rear window 104 for illumination. Additionally, or alternatively, any and/or all speaker(s) 30 may illuminate in a desired color when the vehicle door 36 is placed in an ajar position such that the occupant 60 is notified of the door 36 condition. The inputted light 24 intensity may also vary, or be increased, to provide illumination along a scuff plate at the bottom of the vehicle door 36 opening when each door 36 is moved from a closed position to an open position.

In operation, the light source 80 may be activated using a variety of means. For example, the illuminated speaker 30 may include a user interface 138 (FIG. 9) within the vehicle 28. For example, the user interface 138 and/or audio system 48 may be part of the HMI 46 disposed within the vehicle 28. The user interface 138 may be configured such that a user may control the wavelength of inputted light 24 that is emitted by the light source 80 and/or the portions of the light source 80 that are illuminated. Additionally, or alternatively, the user interface 138 may be used to switch the illuminated speaker 30 through a plurality of modes and/or functions. The user interface 138 may use any type of control known in the art for controlling the light source 80, such as, but not limited to, switches (e.g., proximity sensors, push-type buttons) and may be disposed in any practicable location.

The photoluminescent material 18 is formulated to have an absorption spectrum that includes the emission wavelength of the inputted light 24 supplied from the light source 80. The photoluminescent material 18 is also formulated to have a Stokes shift resulting in the converted visible outputted light 26 having an emission spectrum expressed in a desired color, which may vary per lighting application. The converted visible light 144 is outputted from the diaphragm 64, dust cover 96, and/or any other speaker 30 component to illuminate in the desired color. In one embodiment, the energy conversion process is undertaken by way of down conversion, whereby the inputted light 24 includes light on the lower end of the visibility spectrum such as blue, violet, or ultraviolet (UV) light. Doing so enables blue, violet, or UV LEDs to be used as the light source 80, which may offer a relative cost advantage over simply using LEDs of the desired color and foregoing the energy conversion, process altogether. Moreover, it is contemplated that blue LEDs may be utilized, which may run at a much higher intensity to compensate for dirt, snow, rain, etc. than white LEDs. Also, the utilization of blue LEDs may reduce rearward glare due to relative insensitivity of human eye to blue light so that the illuminated speaker 30 may brilliantly illuminate. Furthermore, the illumination provided by the illuminated speaker 30 may offer a unique, substantially uniform, and/or attractive viewing experience that may be difficult to duplicate through non-photoluminescent means.

Referring to FIG. 6, the diaphragm 64 may include the photoluminescent structure thereon in a non-uniform, variable concentration manner, or in any other desired pattern. Additionally, or alternatively, a non-uniform pattern of varying photoluminescent materials 18 and/or photoluminescent structures 10 may be disposed on a portion of the speaker 30. As illustrated, portion 108 of the speaker 30 has the highest concentration of photoluminescent material 18, portion 110 has the next highest concentration, and the remaining portions of the diaphragm 64 include a lesser concentration of photoluminescent material 18. The speaker 30, as illustrated, may be utilized in a front vehicle door 36, as described above, in any other location within the vehicle 28, or within any audio system 48 not integrated into a vehicle. Accordingly, with the illustrated pattern, the light may be uniformly directed towards an occupant 60 in a front seating assembly 42 of the vehicle 28 even while the speaker 30 is disposed forwardly of the occupant 60. Likewise, a variable concentration may be used on the speaker 30 in any other fashion to accomplish any other desired lighting effect. For example, the top portion of the diaphragm 64 may have a high concentration of photoluminescent material 18 such that the speaker 30 may also function as a puddle and/or floor lamp. Alternatively, a substantially uniform concentration of photoluminescent material 18 may be disposed on the entirety of the diaphragm 64, dust cover 96, and/or any other component of the speaker 30.

Figure 7:
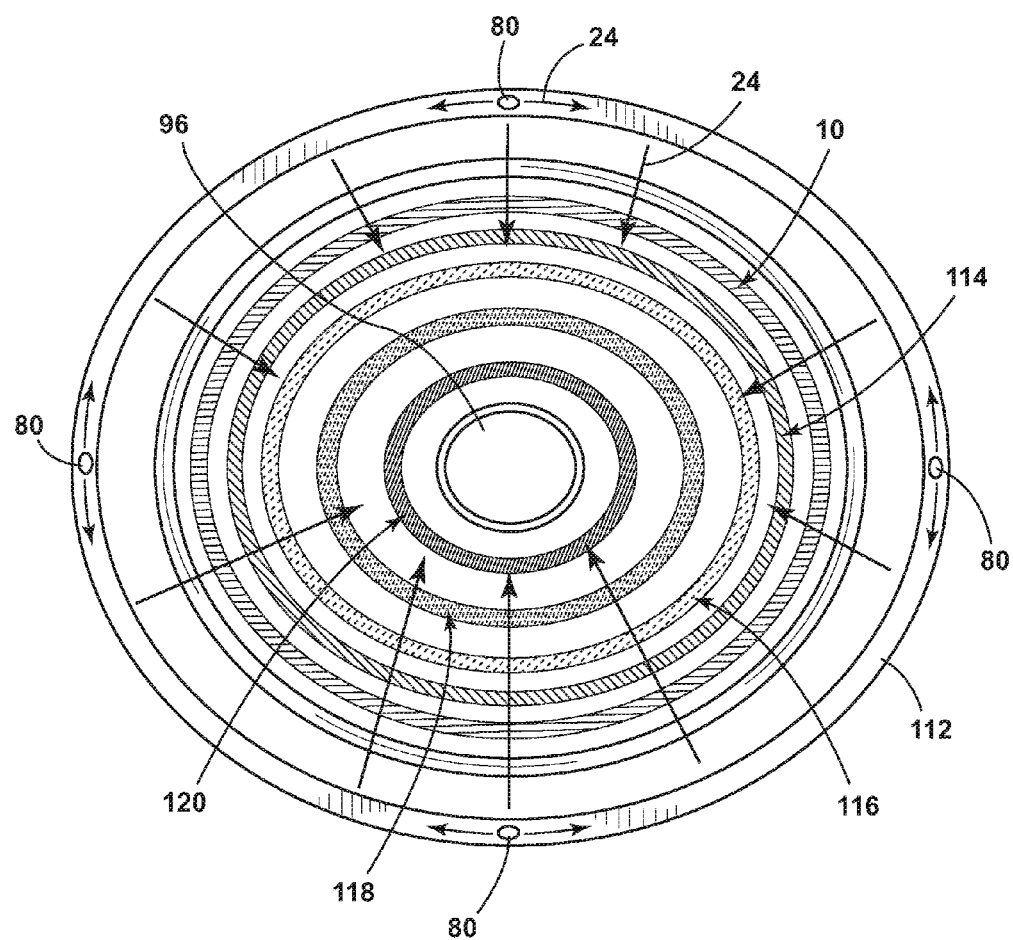
FIG. 7 is a front view of the speaker, according to one embodiment, having a light guide around the top circumference of the diaphragm and a plurality of photoluminescent structures disposed on the diaphragm circumferentially around the dust cap.

Referring to FIG. 7, in some embodiments, a plurality of photoluminescent structures 10, 114, 116, 118, 120 may be disposed on and/or within the diaphragm 64. The light source 80 is configured to output a first wavelength of light 24. In response to receiving the inputted light 24 at the first wavelength, any of the plurality of photoluminescent structures 10, 114, 116, 118, 120 may become illuminated and emit outputted light 26 at least at a second wavelength, as described above. Additionally, each photoluminescent structure 10, 114, 116, 118, 120 may illuminate in response to a different wavelength of inputted light 24 such that certain features may be selectively illuminated. The plurality of photoluminescent structures 10, 114, 116, 118, 120 may include any number of photoluminescent materials 18 that are disposed on and/or within the speaker 30 in any matter.

As illustrated in FIG. 7, the plurality of photoluminescent structures 10, 114, 116, 118, 120 are disposed in a circumferential manner around the dust cover 96. Each of the plurality of photoluminescent structures 10, 114, 116, 118, 120 may incorporate one or more photoluminescent material(s) 18 configured to emit a specific color light in response to the excitation generated in response to the inputted light 24 emitted from the light source 80. In some embodiments, a combination of photoluminescent material(s) 18 may be utilized in the photoluminescent structures 10, 148 to output various wavelengths corresponding to different colors of light. The illuminated speaker 30 may provide various benefits including a cost-effective method for providing illumination within the vehicle 28.

With further reference to FIG. 7, the speaker 30 includes an optical grade light guide 112 which is a substantially transparent or translucent pipe suitable for transmitting light as emitted from the light source 80 around a top circumference thereof. The light guide 112 may be formed from a rigid material that is comprised of a curable substrate such as a polymerizable compound, a mold in clear (MIC) material or mixtures thereof. Acrylates are also commonly used for forming rigid light pipes, as well as poly methyl methacrylate (PMMA) which is a known substitute for glass. A polycarbonate material may also be used in an injection molding process to form the rigid light guide 112. Further, the light guide 112 may be a flexible light guide 112, wherein a suitable flexible material is used to create the light guide 112. Such flexible materials include urethanes, silicone, thermoplastic polyurethane (TPU), or other like optical grade flexible materials. Whether the light guide 112 is flexible or rigid, the light guide 112, when formed, is substantially optically transparent and/or translucent and capable of transmitting light. The light guide 112 may be referred to as a light pipe, a light plate, a light bar or any other light carrying substrate made from a clear or substantially translucent plastic. Known methods of attaching the light guide 112 to the speaker 30 involve the bonding of a preformed light guide 112 to the attachment structure 76 by adhesion, such as by using a double-sided tape, or by mechanical connections such as brackets that are formed into the attachment structure 76.

Alternatively, the grill 62 and/or interior door panel and light guide 112 may be integrally formed through a multi-shot molding process. Due to fabrication and assembly steps being performed inside the molds, molded multi-material objects allow significant reduction in assembly operations and production cycle times. Furthermore, the product quality can be improved, and the possibility of manufacturing defects, and total manufacturing costs can be reduced. In multi-material injection molding, multiple different materials are injected into a multi-stage mold. The sections of the mold that are not to be filled during a molding stage are temporally blocked. After the first injected material sets, then one or more blocked portions of the mold are opened and the next material is injected. This process continues until the required multi-material part is created.

According to one embodiment, a multi-shot molding process is used to create portions of the light guide 112, which may be integrally formed with the light source 80. Additional optics may also be molded into the light guide 112 during the multi-material injection molding process. Initially, the grill 62 and/or interior door panel is formed through a first injection molding step. A light guide 112 is then molded and coupled to grill 62 and/or interior door panel in a second injection molding step. Lastly, the light source 80, conductive leads, and/or a heat sink is placed into the mold and thereby proximately disposed to the grill 62 and/or interior door panel and light guide 112 through injection molding or any other known attachment method, such as vibration welding. Integrally forming portions of the light guide 112, while encapsulating the light source 80, and portions of the conductive leads, may protect the light guide 112 from physical and chemical damage arising from environmental exposure.

In alternative embodiments, additional components may be added during one of the injection steps, or successively added in additional injections to adhere more components to the light guide 112. In some embodiments, the light guide 112 may have a photoluminescent material 18 applied thereto.

Figure 8A:
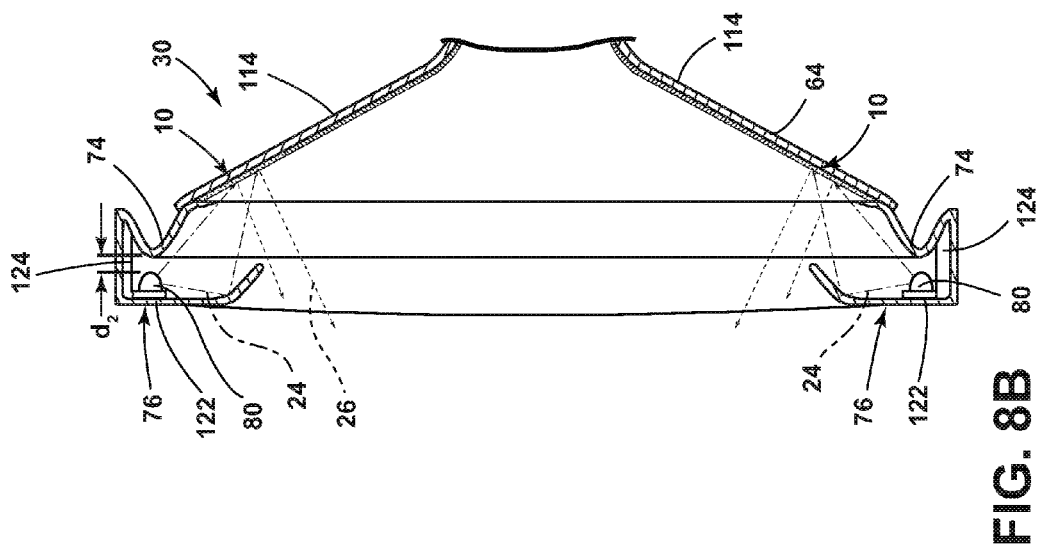
FIG. 8A is a cross-sectional view of the illuminated speaker taken along the line VIII-VIII of FIG. 6 showing the diaphragm in a first position.
Figure 8B:
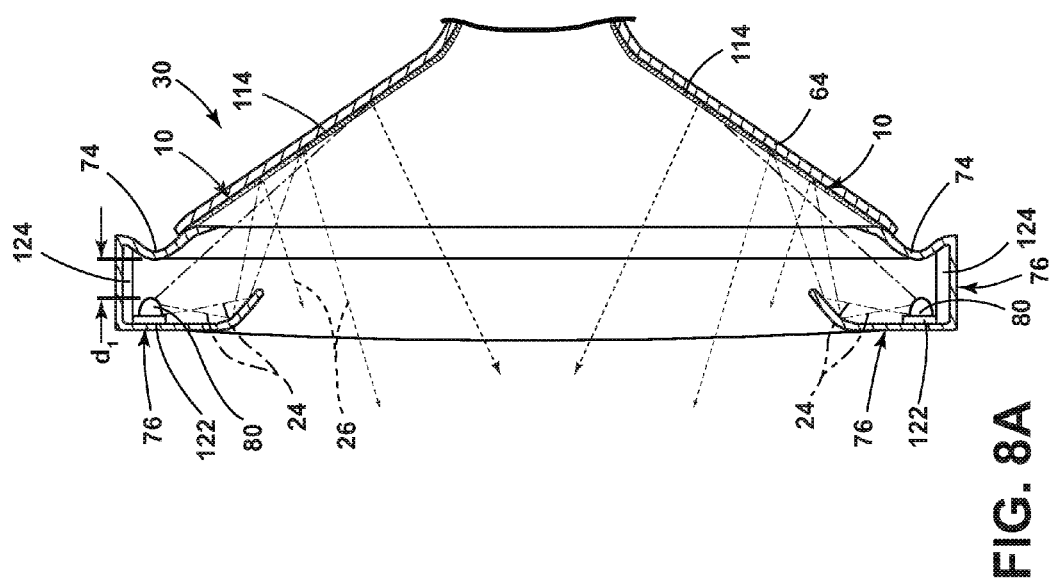
FIG. 8B is a cross-sectional view of the illuminated speaker taken along the line VIII-VIII of FIG. 6 showing the diaphragm in a second position.

Referring to FIGS. 8A-8B, a cross-sectional view of the illuminated speaker 30 taken along the line VIII-VIII of FIG. 6 is illustrated. As illustrated, a pair of light sources 80 is coupled to the attachment structure 76 of the speaker 30. Inputted light 24 emitted from the light sources 80 is directed towards the diaphragm 64 and towards the reflective member 78, which then directs the inputted light 24 towards the diaphragm 64.

When an alternating current electrical audio signal input is applied through the voice coil 82 (FIG. 3), the coil is forced to move rapidly back and forth due to Faraday's law of induction, which causes the diaphragm 64 attached to the coil to move back and forth, pushing on the air to create sound waves. As the oscillation of the diaphragm 64 occurs, the inputted light 24 excites varying photoluminescent structures. Accordingly, as the speaker 30 oscillates, the color emitted from the speaker 30 varies without a change in wavelength from the light sources 80.

As illustrated in FIG. 8A, the diaphragm 64, when disposed at a first distance $d_1$ from the light source 80, may emit outputted light 26 from a plurality of photoluminescent structures to create a first, combined color of light. As illustrated in FIG. 8B, the diaphragm 64 is disposed at a second distance $d_2$ from the light source 80 wherein the diaphragm 64 is closer to the light source 80. As such, the inputted light 24 may only excite the first photoluminescent structure. Accordingly, the combined color of outputted light 26 from the diaphragm 64 may vary in any desired fashion as the diaphragm 64 oscillates.

According to one embodiment, the speaker 30 assembly may further include a printed circuit board (PCB) 122 that is disposed on any portion of the speaker 30, such as the attachment structure 76. The PCB 122 may be secured to the attachment structure 76 at any angle such that the light source 80 disposed on the PCB 122 is positioned towards a desired target location, such as the diaphragm 64. The light source 80 may be disposed on any side of the PCB 122. A white solder mask 124 may be applied to the PCB 122 or to an interior surface of the attachment structure 76 to reflect light incident thereon.

Figure 9:
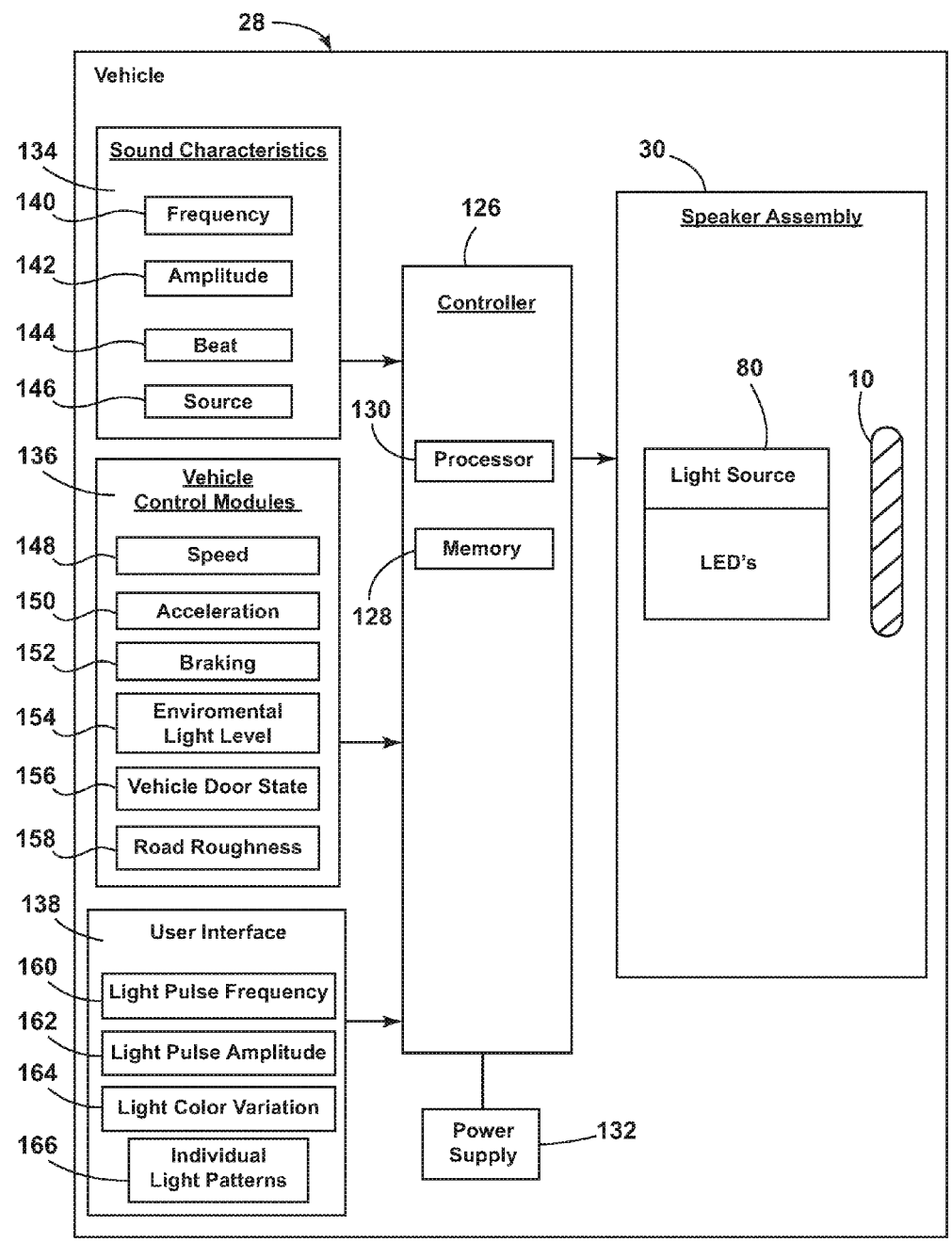
FIG. 9 is a block diagram of the vehicle having the illuminated speaker employed therein.

Referring to FIG. 9, a block diagram of a vehicle 28 is generally shown in which the illuminated speaker 30 is implemented. The vehicle 28 includes a controller 126 in communication with the light source 80. The controller 126 may include memory 128 having instructions contained therein that are executed by a processor 130 of the controller 126. The controller 126 may provide electrical power to the light source 80 via a power source 132 located onboard the vehicle 28. In addition, the controller 126 may be configured to control the inputted light 24 emitted from each light source 80 based on feedback received from one or more inputs.

The inputs that effect the illumination of the speaker 30 may include sound characteristics 134 from the audio system 48, information provided by vehicle control modules 136, and/or speaker illumination settings through the user interface 138. The sound characteristics 134 include frequency 140, amplitude 142, beat 144, and source 146 of inputted sounds. According to one embodiment, the wavelength of light emitted from the light source 80 varies as the frequency 140 and/or amplitude 142 of sound changes. Further, the beat 144 may also effect the color generation from the speaker 30. The lighting system may illuminate in a first color when music from a radio 44 is playing and may illuminate in a second color to provide additional information to an occupant 60. For example, the speaker 30 may illuminate in a second color when a navigation unit within the vehicle 28 is providing directional commands to the occupant 60 and then may return to the first color when the directional command is finished.

Vehicle control modules 136 such as, but not limited to, a body control module, engine control module, steering control module, brake control module, the like, or a combination thereof may also vary the colors of outputted light 26 from the speaker 30. By controlling the inputted light 24 emitted from the light source 80, the illuminated speaker 30 may illuminate in a variety of colors and/or patterns to provide an aesthetic appearance, or may provide vehicle information to an intended observer. For example, the speaker 30 outputted light 26 color may vary as the speed 148 and/or acceleration 150 of the vehicle 28 is varied. Also, as described above, the speaker 30 may be utilized in conjunction with the vehicle braking system 152 to provide additional illumination during a braking period. Additionally, or alternatively, the speakers 30 may also illuminate in a desired color, such as red, when the vehicle 28 approaches another object at a rapid speed to warn the occupants 60 of the upcoming object.

The ambient light level 154 outside the vehicle 28 may also affect the lighting of the speaker 30. For example, the speakers 30 may illuminate at a higher intensity during the day and a lower intensity during low light conditions. Also, as described above, the speakers 30 may illuminate in a desired color to inform an occupant 60 of a specific vehicle condition 156, such as a vehicle door 36 being disposed in an ajar position. Or, the speakers 30 may vary in color with changes in environmental conditions 158, such as road roughness, potential hazards, variations in weather, or for any other reason.

The vehicle 28 may also include a user interface 138 that an occupant 60 may utilize for setting desired lighting effects of the speaker 30. As described above, the user interface 138 may be an independent system, or integrated into any other system, such as the HMI 46, of the vehicle 28. The user interface 138 may be configured such that a user may control the wavelength of inputted light 24 that is emitted by the light source 80. Such a configuration may allow a user to control which features are illuminated. For example, an occupant 60 may control the light pulse frequency 160, light pulse amplitude 162, light color variations 164, and/or individual light patterns 166 through usage of the user interface 138.

In operation, the photoluminescent structure 10 may exhibit periodic unicolor or multicolor illumination. For example, the controller 126 may prompt the light source 80 to periodically emit only the first wavelength of inputted light 24 to cause the photoluminescent structure 10 to periodically illuminate in the first color. Alternatively, the controller 126 may prompt the light source 80 to periodically emit only the second wavelength of inputted light 24 to cause the photoluminescent structure 10 to periodically illuminate in the second color.

Alternatively, the controller 126 may prompt the light source 80 to simultaneously and periodically emit the first and second wavelengths of inputted light 24 to cause the photoluminescent structure 10 to periodically illuminate in a third color defined by an additive light mixture of the first and second colors. Alternatively still, the controller 126 may prompt the light source 80 to alternate between periodically emitting the first and second wavelengths of inputted light 24 to cause the photoluminescent structure 10 to periodically illuminate by alternating between the first and second colors. The controller 126 may prompt the light source 80 to periodically emit the first and/or second wavelengths of inputted light 24 at a regular time interval and/or an irregular time interval.

With respect to the above examples, the controller 126 may modify the intensity of the emitted first and second wavelengths of inputted light 24 by pulse-width modulation or current control. In some embodiments, the controller 126 may be configured to adjust a color of the emitted light by sending control signals to adjust an intensity or energy output level of the light source 80. For example, if the light source 80 is configured to output the first wavelength at a low level, substantially all of the first wavelength may be converted to the second wavelength. In this configuration, a color of light corresponding to the second wavelength may correspond to the color of the emitted light from the illuminated speaker 30. If the light source 80 is configured to output the first wavelength at a high level, only a portion of the first wavelength may be converted to the second wavelength. In this configuration, a color of light corresponding to mixture of the first wavelength and the second wavelength may be output as the emitted light. In this way, each of the controllers 126 may control an output color of the emitted light.

Though a low level and a high level of intensity are discussed in reference to the first wavelength of inputted light 24, it shall be understood that the intensity of the first wavelength of inputted light 24 may be varied among a variety of intensity levels to adjust a hue of the color corresponding to the emitted light from the illuminated speaker 30. The variance in intensity may be manually altered, or automatically varied by the controller 126 based on pre-defined conditions. According to one embodiment, the intensity may be varied based on the environmental light level 154. As such, a first intensity may be output from the illuminated speaker 30 when a light sensor senses daylight conditions. A second intensity may be output from the illuminated speaker 30 when the light sensor determines the vehicle 28 is operating in a low light environment.

As described herein, the color of the outputted light 26 may be significantly dependent on the particular photoluminescent materials 18 utilized in the photoluminescent structure 10. Additionally, a conversion capacity of the photoluminescent structure 10 may be significantly dependent on a concentration of the photoluminescent material 18 utilized in the photoluminescent structure 10. By adjusting the range of intensities that may be output from the light source 80, the concentration, types, and proportions of the photoluminescent materials 18 in the photoluminescent structure 10 discussed herein may be operable to generate a range of color hues of the emitted light by blending the first wavelength with the second wavelength.

Accordingly, a passively illuminated speaker for a vehicle has been advantageously provided herein. The illuminated latch retains its structural properties while providing photoluminescent light having both functional and decorative characteristics.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A speaker comprising:
   a light source configured to emit input light;
   a diaphragm configured to move as a magnet receives electrical signals, the light source disposed on a first side of the diaphragm;
   a first photoluminescent structure disposed on the diaphragm; and
   a second photoluminescent structure disposed on the diaphragm, wherein the input light emitted from the light source is converted to output light of a different wavelength by the first and second photoluminesent structures and is emitted from the first side of the diaphragm.

2. The speaker of claim 1, wherein light emitted from the source comprises one of a blue light, violet light, and a UV light.

3. The speaker of claim 1, wherein the first and second photoluminescent structures are at varying distances from the light source such that a plurality of colors may be emitted from the diaphragm based on a combination of outputted light from the first and second photoluminescent structures as the diaphragm moves.

4. The speaker of claim 1, wherein the first or second photoluminescent structure includes a variable concentration of photoluminescent material.

5. The speaker of claim 1, wherein the photoluminescent structure comprises at least one photoluminescent material configured to down convert an inputted light received from at least a portion of the light sources into a visible light.

6. The speaker claim 1, further comprising:
   a controller for controlling an activation state of the light source in response to at least one vehicle-related condition.

7. A vehicle comprising:
   a speaker including a diaphragm;
   a light source configured to emit inputted light at a first wavelength towards the diaphragm; and
   a first photoluminescent structure disposed on the diaphragm, wherein the first photoluminescent structure is configured to luminesce in response to excitation by the light source and emits varying colors of outputted light based on a vehicle condition.

8. The vehicle of claim 7, wherein the light source is configured as an LED and is disposed on an attachment structure.

9. The vehicle of claim 7, wherein the first photoluminescent structure comprises at least one photoluminescent material configured to down convert an inputted light received from at least a portion of the light source into a visible light that is outputted from the diaphragm.

10. The vehicle of claim 7, wherein the inputted light comprises one of blue light, violet light, and UV light.

11. The vehicle of claim 7, further comprising:
    a second photoluminescent structure disposed on the diaphragm, wherein the speaker illuminates in a plurality of colors as the first and second photoluminescent structures are excited at varying ratios while the diaphragm oscillates.

12. The vehicle of claim 7, further comprising:
a light guide disposed circumferentially above the diaphragm and configured to emit inputted light towards the diaphragm.

13. An illuminated speaker for a vehicle, comprising:
a light source configured to emit inputted light optically coupled with a component of the vehicle speaker; and
a first photoluminescent structure disposed on the component and configured to reflectively emit outputted light in response to light emitted from the light source, wherein the inputted light and outputted light are of varying wavelengths.

14. The illuminated speaker for a vehicle of claim 13, wherein the component is a diaphragm.

15. The illuminated speaker for a vehicle of claim 13, wherein the component is a dust cover.

16. The illuminated speaker for a vehicle of claim 13, wherein the photoluminescent structure comprises at least one luminescent material configured to down convert an inputted light received from at least a portion of the light source into a visible light that is outputted to a viewable portion.

17. The illuminated speaker for a vehicle of claim 13, wherein the inputted light comprises one of a blue light, violet light, and UV light.

18. The illuminated speaker for a vehicle of claim 13, further comprising:
a reflective member configured to direct light emitted from the light source towards a desired location coupled to an attachment structure of the speaker.

19. The illuminated speaker for a vehicle of claim 13, wherein the speaker illuminates in a first color while a first vehicle system utilizes the speaker and a second color when a second vehicle system utilizes the speaker.

* * * * *